Patented Apr. 23, 1940

2,198,293

UNITED STATES PATENT OFFICE 2,198,293

MINERAL OIL COMPOSITION CONTAINING WAX-ARYL ETHER ACIDS

Orland M. Reiff, Woodbury, N. J., and Ferdinand P. Otto, Philadelphia, Pa., assignors to Socony-Vacuum Oil Company, Incorporated, New York, N. Y., a corporation of New York No Drawing. Application August 26, 1938, Serial No. 226,911

20 Claims. (Cl. 87—9)

This invention has to do in a general way with mineral oil compositions and is more particularly related to compositions comprised of a mineral oil fraction and a minor proportion of an added ingredient which will improve this oil in one or more important respects.

It is the principal object of this invention to provide a viscous mineral oil composition in which the pour point has been substantially depressed or in which the viscosity index has been substantially improved or in which a depression of pour point and improvement of viscosity index have been simultaneously effected by a single novel improving agent.

The novel oil-improving agents contemplated herein may be broadly classified as oil-miscible wax-(or heavy alkyl)-substituted aryl ether acids. They may also be characterized as hydroxyaromatic (phenolic) compounds in which part of the nuclear hydrogen has been replaced with an aliphatic hydrocarbon group or groups derived from a high molecular weight aliphatic or predominantly aliphatic hydrocarbon material and in which hydroxyl hydrogen has been replaced with an organic (aliphatic, alicyclic, or aromatic) mono- or poly- carboxylic acid group. A compound or composition of this character satisfying the requisites of the present invention may, in the simplest form, be represented by the general formula:

I.     R(T(O·Z·COOH)

in which T represents an aromatic nucleus; R represents at least one aliphatic hydrocarbon group attached to T and having at least twenty carbon atoms which we may refer to herein as a heavy alkyl group or as a "wax" group; and (O·Z·COOH) represents at least one ether acid or oxy-acid substituent attached to T and wherein O represents oxygen, Z represents an aliphatic, alicyclic, or aromatic group, and COOH represents at least one carboxyl group attached to Z.

In addition to the heavy alkyl substituent R and the ether acid substituent (O·Z·COOH), the compounds or compositions contemplated herein as mineral oil-improving agents may have additional nuclear hydrogen on the nucleus T replaced with other substituents which may or may not have an oil-solubilizing effect upon the composition as a whole. Such a compound in its simplest form may be represented by the formula:

II.     R(T(O·Z·COOH)Y)

in which Y represent residual hydrogen on the nucleus T which may be replaced by a radical from the group consisting of: aliphatic hydrocarbon groups having less than twenty carbon atoms, alkoxy, aroxy, aralkyl, alkaryl, aryl, hydroxy, chlorine, nitro and amino radicals or groups. Compounds of the above general formula type having mono-, di- and tri-cyclic nuclei are illustrated by the following specific formulae:

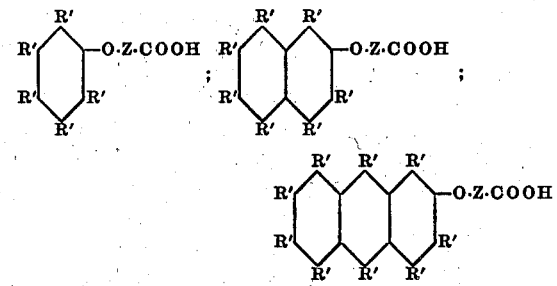

in which at least one R' represents an aliphatic radical or group having at least twenty carbon atoms and in which the remaining R"'s represent residual hydrogen which may be replaced with aliphatic hydrocarbon groups having less than twenty carbon atoms, hydroxy, chlorine, alkoxy, aroxy, aralkyl, alkaryl, aryl, nitro and amino radicals or groups.

In the foregoing examples it will be observed that the heavy alkyl substituent R (or R') is a monovalent aliphatic hydrocarbon group, but as will appear from the hereinafter described synthesis of our oil-improving agents, part or all of the heavy alkyl substituents may be composed of polyvalent derivatives of high molecular weight (at least twenty carbon atoms) aliphatic hydrocarbon radicals or groups in which substitution takes place at the several valence bonds with separate aromatic nuclear groups (T). Compounds of this type are included under the following general formula representation:

III.     R$^v$(T(O·Z·COOH)Y$_b$)$_n$ in which T and (O·Z·COOH) have the same significance indicated above; R$^v$ represents at least one heavy alkyl radical or group containing at least twenty carbon atoms, such heavy alkyl group or groups being attached by one valence only to at least one aromatic nucleus T, $v$ representing the valence of the aliphatic radical R$^v$, which may be one to four; Y$_b$ represents a monovalent element or group selected from the class identified above in connection with Y; $b$ represents the number of Y$_b$'s, or perhaps more accurately the number of Y's, and is equal to zero or a whole number corresponding to the replaceable hydrogens on the nucleus T not substituted with R$^v$ and (O·Z·COOH); and $n$ represents a whole number from one to four and indicates the total number of groups (T(O·Z·COOH)Y$_b$) present in the molecule represented by the formula which are attached to the aliphatic group or groups represented by R$^v$ through the valences $v$.

In the foregoing general formula representation III it will be seen that the compounds represented thereby include those materials in which all of the aliphatic substituent is monovalent ($v=1$ and $n=1$) or in which all of the aliphatic substituent is polyvalent ($v$ and $n$ being equal to two, three, or four); or since $R^v$ is defined as being at least one heavy alkyl radical or group and may therefore include several such groups, it will be seen that this general Formula III is inclusive of compounds having heavy alkyl groups or radicals of varying valences (from one to four) in the same molecule. Also it will be observed that since $n$ may be any whole number from one to four, the number of aromatic nuclei T in the molecule may likewise vary from one to four. It will be seen, therefore, that the relationship between $n$ and $v$ in Formula III in its broadest aspect is such that when $n$ is equal to one, $v$ is equal to one; and when $n$ is greater than one, the valence $v$ of at least one of the $R^v$'s is equal to $n$ (in order to tie the several nuclei or T's together), the valence of any remaining $R^v$'s being any whole number equal to or less than $n$.

As stated above, and as will appear more fully later on from the description of their synthesis, these materials represented by general Formula III may contain both monovalent and polyvalent heavy alkyl substituents.

Compounds of this general type, which include polyvalent-substituted aliphatic substituents and may also include both the monovalent and the polyvalent substituents, are included under the subgeneric formula representation:

IV. $\quad R^{v'}(T(O \cdot Z \cdot COOH) Y_{b'} R_c)_{n'}$ in which T and ($O \cdot Z \cdot COOH$) have the same significance as indicated above; $R^{v'}$ represents at least one polyvalent heavy alkyl radical or group having a valence $v'$ of two, three, or four; $Y_{b'}$ indicates the same group of substituents as described above for Y; $R_c$ represents monovalent heavy alkyl radicals (of at least twenty carbon atoms); $b'$ represents the number of $Y_{b'}$'s and is equal to zero or a whole number corresponding to the valences on the nucleus T not satisfied with $R^{v'}$, ($O \cdot Z \cdot COOH$) and $R_c$; $c$ indicates the number of $R_c$'s and is equal to zero or a whole number corresponding to the valences on the nucleus T not satisfied with $R^{v'}$, ($O \cdot Z \cdot COOH$) and $Y_{b'}$; and $n'$ represents a whole number from two to four and indicates the total number of the groups $(T(O \cdot Z \cdot COOH) Y_{b'} R_c)$ present in the molecule represented by the formula which are attached to the aliphatic group or groups represented by $R^{v'}$ through the valence bonds $v'$.

In the above general Formulae III and IV it will be understood that since $R^v$ and $R^{v'}$ are aliphatic hydrocarbon radicals of the chain type and are each attached through one valence bond only to each corresponding aromatic nucleus T, the valence $v$ or $v'$ of such radical or radicals is of necessity never greater than the number $n$, which indicates the number of aromatic nuclei T in the molecule and in Formula III is always equal to one when $n$ equals one. Otherwise an $R^v$ or an $R^{v'}$ having a valence greater than the number ($n$ or $n'$) of aromatic nuclei would either have some of its valence bonds unsatisfied or else would form a condensed ring or rings by attachment at two or more points to one and the same aromatic nucleus. Such latter compounds, as already indicated from the definition of $R^v$ or $R^{v'}$, are not considered as characterizing the product of the present invention although probably formed in some instances in minor amounts as unobjectionable by-products by certain of the methods of preparation herein disclosed.

A simple type of compound coming under general Formula III in which $v$ and $n$ is each equal to one and in which there is only one heavy alkyl group $R^v$ may be illustrated by the following formula showing T for purposes of illustration as a monocyclic nucleus:

A.
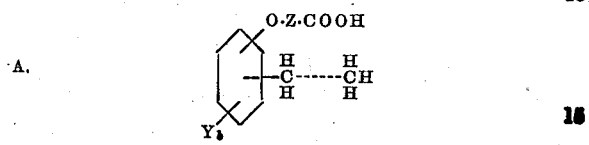

In the above formula the chain represents the heavy alkyl ($R^v$) substituent, and $Y_b$ and ($O \cdot Z \cdot COOH$) have the same significance as has been heretofore given to these groups.

Since group $R^v$ has been defined as "at least one," it will be apparent that there may be more than one heavy alkyl substituent attached to the nucleus T. Such a compound, where $v$ and $n$ are each one and in which there are two such monovalent $R^v$ groups, may be represented by the following formula:

B.
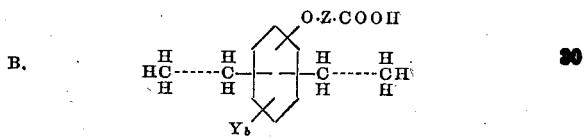

in which the chains and the substituent characters have the same significance defined above.

Compounds of the type satisfying the general Formula III and the subgeneric Formula IV in which $R^v$ (or $R^{v'}$) is polyvalent and $v$ or $v'$) and $n$ (or $n'$) are more than one and in which there is only one such polyvalent $R^v$ group may be illustrated by the following formula, in which the aryl nucleus T is again indicated for illustration as being monocyclic:

C.
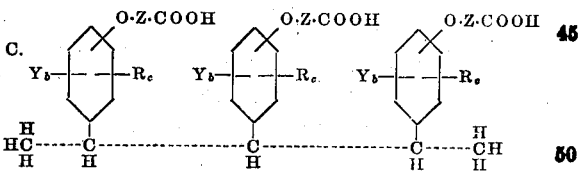

In the above Formula C, $R_c$ is a monovalent heavy alkyl group as defined above under Formula IV and is the same as monovalent $R^v$ in Formula III.

Under this same type of compound indicated by Formula C there may also be more than one polyvalent $R^v$ group (represented by the chain), such a compound in which there are, for example, two polyvalent $R^v$ groups being illustrated by the following formula, in which the characterizing groups have the same significance described above under Formula C.

D.
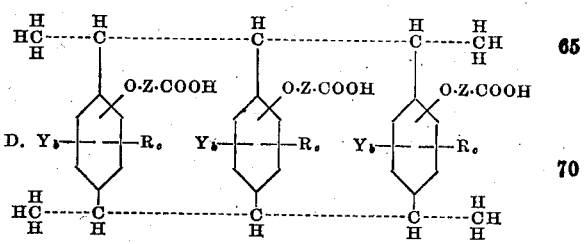

The possible molecular structure of compounds in which the aryl nucleus T is polycyclic will be obvious from the foregoing exemplary Formulae A to D inclusive, and the possible molecular structure of compounds in which $v$ and $n$ are equal to two and four will be readily understood from the exemplary Formulae C and D.

Another possible molecular structure of compounds coming under general Formula III is a compound having more than one polyvalent $R^v$, at least two of which have different valences. Such a compound may be typified by the following formula in which the symbols have the same significance as in Formula C:

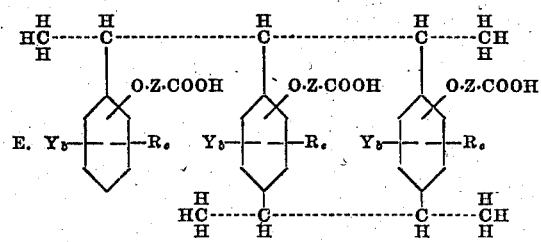

As to the possible number of $R^v$ (and $R_c$) groups going to make up a single molecule, this will vary with the extent to which it is desired to effect substitution of the nucleus with the heavy alkyl groups for obtaining the desired properties in the product and is, of course, limited by the number of replaceable hydrogens on the aromatic nucleus which are available for substitution. As will be apparent to those skilled in the art, the maximum possible number of $R^v$ (and $R_c$) groups which may be attached to a single aromatic nucleus will vary as the nucleus is mono- or polycyclic and also as the nucleus is otherwise substituted. It will also be apparent that all the available hydrogen on the nuclei may be replaced by polyvalent aliphatic substituents.

It will be understood that the oil-improving agents used in the mineral oil compositions contemplated by this invention may be pure compounds satisfying the general Formula III described above with any one of the various mono- and poly-cyclic aromatic nuclei as T and the various substituents $R^v$ (or $R^v$ and Y) described, the only requisites being that at least one nuclear hydrogen be substituted with an ether acid or oxyacid group (O·Z·COOH) and at least one nuclear hydrogen be substituted with an aliphatic hydrocarbon group of at least twenty carbon atoms. However, in manufacturing the preferred oil-improving product of the present invention by the preferred method of procedure, as will appear more fully later on, the final oil-improving product obtained is normally or usually a mixture of different compounds corresponding to different values of $n$ and $v$ and to different numbers of heavy alkyl groups $R^v$.

Since the present invention is directed to a mineral oil composition, it is important that the alkylated aryl ether acid oil-improving agents as represented by general Formulae III and IV have nuclear hydrogen in the aromatic nucleus T substituted with heavy alkyl groups which comprise a sufficient proportion of the composition as a whole to render the same miscible with the mineral oil fraction in which the improving agent is used under normal conditions of handling and use. It appears from the results of our research that there is a critical range in the degree of alkylation of these improving agents with heavy alkyl groups, such as those derived from petroleum wax, below which the product or agent will not satisfy the requirements for oil-miscibility. Expressing this in another way, it appears that the hydroxyaromatic constituent of an alkylated hydroxyaromatic compound from which the alkylated aryl-ether acid is derived should not exceed a certain percentage of such alkylated hydroxyaromatic composition as a whole. This critical range of alkylation may be roughly expressed as the ratio by weight of $(T(OH))_n$ to $R^v(T(OH))_n$.

The degree of alkylation and the critical ranges within which operative and preferred compounds can be obtained may also be expressed as the number of carbon atoms contained in the aliphatic substituents for each aryl nucleus in a given molecule or molecular structure.

The critical range in the degree of alkylation of the aryl nucleus in the improving agents contemplated herein may vary with: (a) the mineral oil fraction in which the improving agent is to be used; (b) the aryl nucleus T (mono- or polycyclic); (c) the hydroxyl content of the aryl nucleus from which the final product is obtained (mono- or polyhydric); (d) mono- or poly-substitution of the aryl nucleus; and (e) other substituents on the nucleus T, which may be of positive or negative or of neutral solubilizing activity.

In general it may be said that a polycyclic nucleus appears to require a higher degree of alkylation than a mono-cyclic nucleus; and that a polyhydric nucleus requires a higher degree of alkylation than a monohydric nucleus.

In view of the foregoing variables it would be impracticable and probably misleading to attempt to give an expression and figure which would indicate accurately the proper ratio of hydroxyaromatic constituent to the alkylated hydroxyaromatic constituent which would express a degree of aliphatic substitution satisfying all cases taking these variables into account. As a guide for preparing these improving agents, however, our research indicates that for a product having the desired pour depressing and V. I. improving properties the ratio of $$(T(O \cdot Z \cdot COOH))_n$$

to $R^v(T(O \cdot Z \cdot COOH)_n$ expressed as:

VII. $\qquad \dfrac{(T(OH))_n}{R^v(T(OH))_n}$ should not be greater than about .20 or twenty per cent when the weight of the hydroxyaromatic nucleus or component $(T(OH))_n$ is expressed in terms of its chemically equivalent weight of phenol $(C_6H_5OH)$.

It will be observed that the ratio as represented by the Formula VII does not take into account any other substituent in the nucleus than the heavy alkyl substituents and the hydroxyl group or groups; but since the heavy alkyl substituent is primarily relied upon in the agents contemplated herein as the solubilizing substituent, it is believed that the foregoing expression and limits will serve as a working guide for the preparation of the oil-soluble alkylated aryl ether acids contemplated herein as additive agents for improving the pour point and viscosity index of viscous mineral oils.

As stated above, the degree of alkylation may also be expressed by the number of carbon atoms contained in the aliphatic substituent for a given aromatic nucleus T. As a general guide here it may be said that the total amount of heavy alkyl substituent represented by $R^v$ in the above general Formula III should contain an average of at least twenty-five carbon atoms for each aromatic nucleus T.

The ratio of twenty per cent, which we may term the "phenolic ratio," represents what we consider a maximum figure for the preferred products contemplated herein, and in general it will be found that for these preferred products this figure will be lower, the actual ratio, of course, being dependent upon the variable factors enumerated above. For example, as will later appear, an improving agent of the preferred type in which the aliphatic substituent is derived from petroleum wax (a predominantly straight chain aliphatic hydrocarbon of at least twenty carbon atoms) and in which the aromatic nucleus was derived from phenol otherwise unsubstituted ($C_6H_5OH$) may have a phenolic ratio, as expressed above, not substantially greater than about sixteen per cent.

A further general guide for the synthesis of the preferred improving agents for viscous oils is to alkylate the aromatic nucleus so that it is polysubstituted with the aliphatic hydrocarbon radicals or groups of relatively high molecular weight.

Procedures for preparing oil-improving agents contemplated by this invention wherein the other acid substituent is derived from an aliphatic acid may be broadly described as follows:

First the hydroxyl hydrogen in an alkylated hydroxyaromatic compound is substituted with an alkali or alkaline earth metal to form an alkylated aryl alkali or alkaline earth metal oxide:

(a)  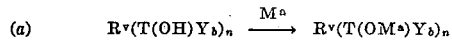

wherein $M^a$ represents the hydrogen equivalent of an alkali or alkaline earth metal.

The aryl metal oxide thus formed is then reacted with the alkali metal salt of a chloraliphatic acid to form the corresponding ether acid salt according to the following equations:

(b)  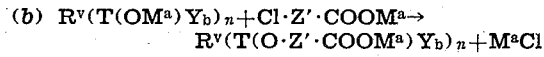

wherein $Z'$ represents an aliphatic group.

The wax-aryl ether aliphatic acid can then be released by neutralization:

(c)  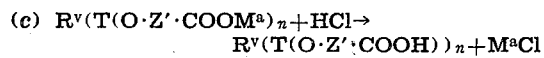

Another desirable procedure for the formation of wax-aryl ether aliphatic acids consists in the use of an ester of the chloraliphatic acid in place of the alkali salt. The reaction procedure is carried out the same as steps (a) and (b) above, but it is necessary to saponify the ester reaction product by reacting with sodium hydroxide, the "salt" formed being neutralized with a mineral acid to obtain the free ether acid.

The foregoing procedures relate to synthesis of wax-aryl ether acids in which the ether acid substituent is an aliphatic acid derivative (wax-aroxy-aliphatic carboxylic acid). Similar acids derived from mono- or poly- basic aromatic acids (wax-aroxy-aromatic carboxylic acids) can be prepared by reacting a wax-aryl alkali or alkaline earth metal oxide with an alkali salt of a brom-aromatic acid and thereafter neutralizing the reaction product with a mineral acid. The etherification can be carried out at a temperature in the neighborhood of 400° F. in the presence of powdered copper as a catalyst.

The details of the foregoing procedures will be further discussed hereinafter with a specific example.

The general reactions described and illustrated above have shown an alkylated or heavy alkyl-substituted hydroxyaromatic compound

as the starting material. Compounds of this nature, which the requirements of high alkylation for the oil-improving agents discussed above, or mixtures of such compounds can be readily prepared by alkylating a mono- or poly- cyclic, mono- or poly- hydric, substituted or unsubstituted hydroxyaromatic compound with aliphatic compounds or predominantly aliphatic materials of high molecular weight.

The starting material for the hydroxyaromatic constituent in the alkylation reaction to obtain an alkylated hydroxyaromatic product

in which $Y_b$, if present, is residual hydrogen, may be a mono- or poly- cyclic hydroxyaromatic compound otherwise unsubstituted; or in certain special cases (to be hereinafter described) the starting material may be an alkyl-aryl ether or an aralkyl-aryl ether. For obtaining an alkylated hydroxyaromatic product containing a "Y" substituent, in addition to or in place of residual hydrogen, the starting material for the hydroxyaromatic constituent may be a mono- or poly- cyclic hydroxyaromatic compound in which part of the nuclear hydrogen is substituted with a member or members of the group consisting of aliphatic hydrocarbon groups containing less than twenty carbon atoms, chlorine, hydroxy, alkoxy, aroxy, aryl, alkaryl, and aralkyl groups.

Examples of the hydroxyaromatic compounds which may be used as starting material for the alkylation reaction are: phenol, resorcinol, hydroquinone, catechol, cresol, xylenol, hydroxydiphenyl, benzylphenol, phenyl-ethyl-phenol, phenol resins, methyl-hydroxydiphenyl, guaiacol, alpha and beta naphthol, xylyl naphthol, benzyl naphthol, anthranol, phenyl methyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthol.

The alkylation of the hydroxyaromatic compound may be accomplished in various ways, such as by a Friedel-Crafts synthesis, using a halogenated high molecular weight aliphatic hydrocarbon, or by reaction with unsaturated high molecular weight aliphatic compounds or higher alcohols in the presence of $H_2SO_4$ as a catalyst.

We have found the Friedel-Crafts type of alkylation reaction to be particularly adapted to the step of preparing the alkylated hydroxyaromatic compounds from which the improving agents described herein are synthesized because it affords a convenient means for controlling the degree of alkylation and obtaining the desired "phenolic ratio" for use in the preferred mineral oil compositions contemplated by this invention.

In this reaction an appropriate mono- or polychlorine-substituted (or other halogen-substituted) aliphatic compound or material is reacted with the desired hydroxyaromatic compound in the presence of a catalytic amount of aluminum chloride or other suitable Friedel-Crafts catalyst. Pure or substantially pure mono- or polychlorine-substituted aliphatic compounds may be used. However, as will be readily understood by those skilled in the art, since it is usually very difficult to prepare or obtain high molecular weight aliphatic hydrocarbons in a pure or substantially pure state and since it is equally difficult to prepare the chlorine (or other halogen) substitution products of such hydrocarbons in a pure or substantially pure state, we prefer to employ a mixture of such hydrocarbons, such as a suitable petroleum fraction, as the starting material for our preferred improving agents, converting it into a mixture of different chlorine (or other halide) substitution products by any suitable method for use in the alkylation step. In general it may be said that the high molecular weight aliphatic hydrocarbons contemplated by this invention as preferred sources for the alkyl or aliphatic substituent $R^v$ in Formula III above may be pure or mixed compounds typified by those which characterize the heavier products of petroleum, such as heavy petroleum oils of the lubricant type, petrolatum, and crystalline petroleum wax or other compounds or materials which will result in relatively long chain aliphatic substituents. Special preference is given to petroleum wax of melting point not substantially less than about 120° F. Such specially preferred aliphatic hydrocarbon materials commonly have molecular weights of about 300 and have at least twenty carbon atoms in their molecules.

As stated above, the Friedel-Crafts synthesis affords a convenient means of controlling the "degree of alkylation" of the product. This is accomplished by controlling: (a) the chlorination of the aliphatic hydrocarbon and (b) the reacting proportions of the chlorinated aliphatic hydrocarbon and the hydroxyaromatic compound used in the Friedel-Crafts reaction. As is well known to those skilled in the art, the replacement of nuclear hydrogen in the hydroxyaromatic compound with an aliphatic group is, in the Friedel-Crafts synthesis, effected by reaction of such nuclear hydrogen with chlorine in the chlorinated aliphatic compound, the substitution being effected with evolution of HCl. It will thus be seen that the number of chlorine substituents in a chlorinated aliphatic compound corresponds to the number of valences ($v$ in general Formula III) which will be satisfied by or attached to hydroxyaromatic nuclei in the product of the reaction. For example, in a reaction where a quantity of pure monochloraliphatic hydrocarbon containing say three atomic proportions of chlorine is reacted with one molecular proportion of hydroxyaromatic compound, the resulting alkylated product, $R^v(T(OH)Y_b)_n$, is one in which $v$ and $n$ are equal to one and there are three aliphatic groups $R^v$ attached to one nucleus T. On the other hand, assuming a reaction in which a quantity of pure trichloraliphatic hydrocarbon containing three atomic proportions of chlorine is reacted with one molecular proportion of hydroxyaromatic compound, the product would be one in which $v$ and $n$ of general Formula III are each equal to three, and the solubilizing action of a single high molecular weight aliphatic group would be distributed among three nuclear hydroxyaromatic groups. It is due to this latter condition that we consider it preferable that the number of valences "$v$" (in $R^v$ of Formulae III, etc.) be maintained within the range of from one to four hereinabove specified. In other words, it appears that the required oil-solubilizing and oil-improving action of the aliphatic substituent $R^v$, particularly where the aliphatic substituent is a wax derivative and the agent is to be used for improving the viscosity index and pour point of viscous oils, is not obtained with materials predominantly comprised of a compound or compounds $$R^v(T(O \cdot Z \cdot COOH)Y_b)_n$$

(Formula III) in which $v$ and $n$ are greater than four. Hence, for use in the Friedel-Crafts reaction the chlorinated high molecular weight aliphatic material should be a compound, or should be predominantly comprised of compounds, in which the chlorine content is not substantially greater than a tetrachlor compound.

As will be readily apparent to those skilled in the art, the chlorination of an aliphatic material such as a liquid petroleum fraction or a crystalline petroleum wax will normally or usually result in a mixture of mono- and polychloraliphatic hydrocarbon compounds. Consequently, the product of a Friedel-Crafts reaction between such chlorinated material and a hydroxyaromatic compound will be a mixture of different compounds corresponding to different values of $v$ and $n$ in the formula $R^v(T(OH)Y_b)_n$ and the final alkylated aryl ether acid derived therefrom according to the reactions described above will likewise be a mixture of compounds corresponding to different values of $n$ and $v$ in general Formula III. It will be understood, therefore, that the specific values for $v$ and $n$ in the above formula, as well as the formula itself, relate to the different specific compounds present in such a mixture which characterize it as a product of the present invention.

However, in the case of a pure compound corresponding to general Formula III or in mixtures thereof, we have, as previously stated, discovered that for a satisfactory product, the ratio by weight of hydroxyaromatic component $(T(OH))_n$ to the corresponding alkylated hydroxyaromatic nucleus or component $$(R^v(T(OH))_n$$

should not be greater than a certain critical maximum ratio which varies with constituents, conditions of use, and properties desired, as discussed in detail hereinabove.

The above-mentioned ratio of hydroxyaromatic component to the corresponding alkylated hydroxyaromatic component:

$$\frac{(T(OH))_n}{R^v(T(OH))_n}$$

in which the hydroxyaromatic component is calculated as phenol and which is therefore herein referred to as the phenol content or "phenolic ratio," is usually calculated from the weight of the hydroxyaromatic compound used up in the alkylation reaction and from the total weight of alkylated compound resulting from such alkylation reaction, as will be readily understood by those skilled in the art.

In the foregoing discussion of the Friedel-Crafts alkylation reaction we have referred to a hydroxyaromatic compound as a starting material. This same reaction may be used with an alkyl-aryl ether or an aralkyl-aryl ether, which undergoes a substantial rearrangement during Friedel-Crafts alkylation to form an alkylated hydroxyaromatic compound in which the alkyl group of the ether replaces one of the nuclear hydrogen atoms.

In the event it is desired to obtain a product $R^v(T(O \cdot Z \cdot COOH)Y_b)_n$ which contains an alkoxy group as the substituent $Y_b$, it is preferable that the alkylation be effected with a hydroxyaromatic compound containing such alkoxy or aroxy group as a substituent and a high molecular weight unsaturated aliphatic hydrocarbon of carbon chain length of twenty or more carbon atoms (such as eicosylene, cerotene, melene, etc.) or a higher alcohol of chain length of at least twenty carbon atoms, (such as ceryl alcohol, myricyl alcohol, etc.), using $H_2SO_4$ as a catalyst. By this procedure, the hydroxyaromatic ether can be alkylated without substantial rearrangement taking place. As an alternative procedure, polyhydric phenols can be alkylated by reaction with alcohols or unsaturates or by Friedel-Crafts reaction followed by substitution of one hydroxyl hydrogen with a low molecular weight alkyl group. In carrying out this latter procedure, the alkylated polyhydric phenol is treated with an alkali alcoholate to introduce alkali metal into the OH group followed by reaction with the desired alkyl halide, whereby the substitution is effected.

When it is desired to obtain a nitro or amino group as the substituent "$Y_b$" in general Formula III, the hydroxyaromatic compounds are alkylated when free of nitro or amino groups, and such alkylation is followed by nitration of the alkylated compound to introduce the nitro substituent. The amino group can be obtained by reduction of the nitro group.

Examples of the halogenated organic acids which may be used (as their alkali metal salts) in the formation of aryl ether acids are the monobasic aliphatic acids, such as acetic, butyric, octoic, palmitic, stearic, naphthenic, etc.; polybasic acids, such as maleic, succinic, adipic, etc.; aromatic acids such as benzoic, phthalic, cinnamic, furoic, etc. Both aliphatic and aromatic type acids may also carry substituents such as keto, nitro, amino, and hydroxy groups, etc.

PREPARATION OF WAX-SUBSTITUTED PHENOXY-ALIPHATIC CARBOXYLATE SALTS

(1) ALKYLATION OF PHENOL

A paraffin wax melting at approximately 120° F. and predominantly comprised of compounds having at least twenty carbon atoms in their molecules is melted and heated to about 200° F., after which chlorine is bubbled therethrough until the wax has absorbed from sixteen per cent to twenty per cent of chlorine, such product having an average composition between a monochlor wax and a dichlor wax or corresponding roughly to a dichlor wax. Preferably the chlorination is continued until about one-fifth the weight of the "chlorwax" formed is chlorine. A quantity of chlorwax thus obtained, containing three atomic proportions of chlorine, is heated to a temperature varying from just above its melting point to not over 150° F., and one mole of phenol ($C_6H_5OH$) is admixed therewith. The mixture is heated to about 150° F., and a quantity of anhydrous aluminum chloride corresponding to say about three per cent of the weight of chlorwax in the mixture is slowly added to the mixture with active stirring. The rate of addition of the aluminum chloride should be sufficiently slow to avoid violent foaming, and during such addition the temperature should be held at about 150° F. After the aluminum chloride has been added, the temperature of the mixture may be increased slowly over a period of from fifteen to twenty-five minutes to a temperature of about 250° F. and then may be more slowly increased from about 300° F. to about 350° F. If the emission of HCl gas has not ceased when the final temperature is reached, the mixture may be held at about 300° F. or 350° F. for a short time to allow completion of the reaction. But, to avoid possible cracking of the wax, the mixture should not be heated appreciably above 350° F., nor should it be held at that temperature for any extended length of time.

It is important that all unreacted or non-alkylated hydroxyaromatic material (phenol) remaining after the alkylation reaction be removed. Such removal can be effected generally by water-washing, but it is preferable to treat the water-washed product with super-heated steam, thereby insuring complete removal of the unreacted material and accomplishing the drying of the product in the same operation.

The wax-substituted phenol thus obtained may be characterized by the general formula $R^v(T(OH)Y_b)_n$, in which $R^v$ represents at least one aliphatic group or radical characteristic of paraffin wax having a valence $v$ of from one to four; T represents a monocyclic aromatic nucleus; $Y_b$ represents residual hydrogen, "$b$" being a number corresponding to the number of replaceable hydrogens on the nucleus T not substituted by $R^v$ and (OH); and $n$ is a number from one to four corresponding to the valences $v$ on the aliphatic group or groups $R^v$ which are satisfied by the nuclear group or groups $T(OH)Y_b$.

A wax-substituted phenol prepared according to the above procedure, in which a quantity of chlorwax containing three atomic proportions of chlorine (twenty per cent chlorine in the chlorwax) is reacted with one mole of phenol, may, for brevity herein, be designated as "wax-phenol (3–20)." Parenthetical expressions of this type (A—B) will be used hereinafter in connection with the alkylated hydroxyaromatic compounds to designate (A) the number of atomic proportions of chlorine in chloraliphatic material reacted with one mole of hydroxyaromatic compound in the Friedel-Crafts reaction, and (B) the chlorine content of the chlor-aliphatic material. In the above example A=3 and B=20. This same designation will also apply to the "wax"-aryl ether acid derivatives.

Wax-phenol (3–20) as obtained by the above procedure had a phenol content or a "phenolic ratio" of about sixteen per cent. Our research indicates that this phenolic ratio in the neighborhood of sixteen per cent may be considered as representing about the maximum for satisfactory miscibility in viscous oils of the aryl ether acid derivatives of alkylated hydroxyaromatic compounds in which the alkyl substituent is derived from wax and the hydroxyaromatic constituent is derived from phenol ($C_6H_5OH$). Effective oil-improving agents can, however, be obtained from wax-phenol (3–16), in which the phenol content or phenolic ratio is in the neighborhood of thirteen per cent.

(2) FORMATION OF WAX-SUBSTITUTED ALKALI OR ALKALINE EARTH METAL PHENATE

As an example of this step in the preparation of our oil-improving agents, 200 grams of wax-phenol (12.2 per cent combined phenol content) is diluted with 600 grams of mineral oil (Saybolt viscosity: 244 seconds at 130° F.) and reacted with six grams of sodium as sodium ethylate at 300° F. during a one-hour period, allowing this alcohol to distill to complete the formation of the sodium phenate.

(3) FORMATION OF ETHER ACIDS FROM WAX-ALKALI METAL PHENATE

*Example (a).—Wax phenoxy acetic acid*

24.7 grams of monochloracetic acid in 100 cc. of absolute ethyl alcohol was converted to sodium chloracetate by adding dropwise a standard alcohol solution of sodium hydroxide, maintaining the temperature of the reaction mixture below 100° F. This sodium chloracetate suspension was then added to the solution of wax sodium phenate in mineral oil, and the reaction mixture was held at 150° F. during a two-hour period to form the wax-substituted phenoxy sodium acetate. The mixture was then neutralized with dilute hydrochloric acid to liberate this free acid, and was purified by water-washing the product to remove reaction salts. The product thus obtained was then dried to give a concentrated mineral oil blend of the finished wax-phenoxy acetic acid.

*Example (b)—Wax-phenoxy benzoic acid*

A wax-aroxy aromatic carboxylic acid was obtained by reacting 100 grams of wax-phenol with 2.95 grams metallic sodium (in the presence of five per cent by volume of anhydrous amyl alcohol) at 300° F. during a one-hour period, allowing the alcohol to distill to form the wax-sodium phenate. 28.9 grams brom-sodium benzoate was then mixed with the wax-sodium phenate and introduced into an autoclave, the mixture being stirred at a temperature of about 400° F. during a four-hour period in the presence of copper powder as a catalyst to form the sodium salt of the wax-phenoxy benzoic acid. The free acid was obtained by neutralizing the reaction product with aqueous hydrochloric acid, followed by water-washing and drying to obtain the finished product.

Wax-substituted aryl ether acids of the general character described above can be prepared from other wax-substituted hydroxyaromatic compounds, either mono- or poly-cyclic and substituted or unsubstituted, such, for example, as wax-naphthol (3-14) having a combined naphthol content of sixteen per cent and equivalent phenolic content or "phenolic ratio" of 10.4 per cent. They may also be obtained with other alkyl substituents than petroleum wax, although, as indicated above, alkylated hydrocarbons of the wax type (having at least twenty carbon atoms) are preferred in obtaining pour depressants and V. I. improvers of high effectiveness. It is also emphasized that the invention is not limited to products obtained from acetic acid and benzoic acid as a source for the ether acid substituent but that any organic acid (as the alkali salt thereof) may be used to obtain various aliphatic or aromatic groups in the ether acid or oxy-acid substituent.

Wax-aryl ether acids of the type described above are highly viscous rubber-like products, which with the phenolic ratio properly controlled are readily soluble in mineral oils. Their color is such that they can be readily blended with light-colored mineral oil fractions without substantial darkening of the oil, which makes them particularly desirable for use in this connection.

As will appear from the foregoing description, the oil-improving agents contemplated by this invention are characterized by the general Formula III $(R^v(T(O \cdot Z \cdot COOH)Y_b)_n$ described hereinabove. Such compounds or products may be broadly characterized as alkylated or wax-substituted aryl ether acids. Ether acids derived from fatty acids may be characterized as oil-miscible alkylated or alkyl-substituted aroxy-aliphatic carboxylic acids, and those derived from aromatic acids may be characterized as alkyl-substituted aroxy-aromatic carboxylic acids. These complex ether acids may also be defined as alkylated hydroxyaromatic compounds in which the hydroxyl hydrogen has been substituted with an organic acid group, it being understood that the terms "alkyl" and "alkylated" are used herein in a broad sense to include polyatomic or polyvalent, as well as monovalent aliphatic radicals or groups; also that the term "wax" as used herein is used in a broad sense to designate aliphatic or predominantly aliphatic hydrocarbon compounds or materials having at least twenty carbon atoms.

To demonstrate the effectiveness of compounds or products of the type described above in the mineral oil compositions contemplated by this invention, we have conducted several comparative tests, the results of which are listed below, with representative mineral oils alone and with the same oils blended with the improving agents contemplated by this invention.

POUR POINT DEPRESSION

The wax-substituted aroxy-aliphatic carboxylic acids are effective pour point depressants, as indicated by the results tabulated below. These results were obtained from blend of mineral lubricating oil having a Saybolt universal viscosity of 244 seconds at 130° F. and containing wax-substituted metal salts of the phenyl-ether type derived from wax-phenol and prepared according to the procedures outlined above. The pour point of the oil alone was 20° F., and, as is clearly indicated by Table I below, the wax-aryl ether acids are effective in very small amounts to reduce the pour point as much as 40° F.

*Table I*

| Depressant blended with motor oil of Saybolt viscosity of 244 sec. @ 130° F. | A. S. T. M. pour tests on oil and oil blends | | |
|---|---|---|---|
| | 0% | ¼% | ⅛% |
| | °F. | °F. | °F. |
| Wax-phenoxy-acetic acid (3-16) | +20 | −20 | −15 |
| Wax-phenoxy-benzoic acid (3-16) | +20 | −20 | −20 |

V. I. IMPROVEMENT

Another property of the mineral oil compositions contemplated by this invention which has been investigated and found to have been improved by alkylated aryl-ether acids is the viscosity index. The effectiveness of the wax-aryl ether acids as V. I. improvers is demonstrated by the data in Table II below. In obtaining this data the viscosity index was obtained in the conventional manner from the Saybolt viscosity of the oil and the oil blends at 100° F. and 210° F. The oil used was a viscous mineral oil of the lubricant type.

*Table II*

| Improving agent used | Wt. conc. | 100° F. | 210° F. | V. I. |
|---|---|---|---|---|
| | Percent | | | |
| None | 0 | 141.4 | 41.9 | 81.6 |
| Wax-phenoxy-acetic acid | 2 | 174.4 | 44.5 | 93.0 |
| Wax-phenoxy-benzoic acid | 2 | 162.0 | 43.3 | 91.1 |

From the foregoing results it will be apparent that alkylated (wax-substituted) aryl ether acids of the type contemplated by this invention are effective oil-improving agents.

As to the degree of alkylation, it is important that the aryl nucleus be sufficiently alkylated (or wax-substituted) to provide a final product which is "soluble" or "miscible" in the particular mineral oil fraction with which it is to be blended;

that is, one which will remain uniformly dispersed in the oil in sufficient amount to effect the desired improvement, under normal conditions of storage and use.

The amount of improving agent used may be varied, depending upon the mineral oil or the mineral oil fraction with which it is blended and the properties desired in the final oil composition. The alkylated aryl ether acids of the type described herein may be used in amounts ranging from one-half per cent to ten per cent, and in general compositions of the desired improved properties may be obtained with these improving agents in amounts of from one-half per cent to two per cent.

It is to be understood that while we have described certain preferred procedures which may be followed in the preparation of the alkylated aryl-ether acids used as improving agents in the mineral oil compositions contemplated by this invention and have referred to various representative constituents in these improving agents, such procedures and examples have been used for illustrative purposes only. The invention, therefore, is not to be considered as limited by the specific examples given but includes within its scope such changes and modifications as fairly come within the spirit of the appended claims.

We claim:

1. An improved mineral oil composition comprising a mineral oil fraction and in admixture therewith a minor proportion of an oil-miscible alkyl-substituted aryl ether acid.

2. An improved mineral oil composition comprising a viscous mineral oil fraction and in admixture therewith a minor proportion, sufficient to improve the pour point and viscosity index of said oil, of an oil-miscible alkyl-substituted aryl ether acid in which the alkyl substituent is derived from an aliphatic hydrocarbon having at least twenty carbon atoms.

3. An improved mineral oil composition comprising a viscous mineral oil fraction and in admixture therewith a minor proportion, sufficient to improve the pour point and viscosity index of said oil, of an oil-miscible alkyl-substituted aryl ether acid in which the alkyl substituent is derived from petroleum wax.

4. An improved mineral oil composition comprising a viscous mineral oil fraction and in admixture therewith a minor proportion of an oil-miscible alkyl-substituted aroxy aliphatic carboxylic acid in which the alkyl substituent is derived from an aliphatic hydrocarbon having at least twenty carbon atoms.

5. An improved mineral oil composition comprising a viscous mineral oil fraction and in admixture therewith a minor proportion of an oil-miscible alkyl-substituted aroxy aromatic carboxylic acid in which the alkyl substituent is derived from an aliphatic hydrocarbon having at least twenty carbon atoms.

6. An improved mineral oil composition comprising a viscous mineral oil fraction and in admixture therewith a minor proportion of an oil-miscible wax-substituted aroxy aliphatic carboxylic acid.

7. An improved mineral oil composition comprising a viscous mineral oil fraction and in admixture therewith a minor proportion of an oil-miscible wax-substituted aroxy aromatic carboxylic acid.

8. An improved mineral oil composition comprising a viscous mineral oil fraction and in admixture therewith a minor proporton of from one-half per cent to ten per cent of an oil-miscible wax-substituted aryl ether acid.

9. An improved mineral oil composition comprising a viscous mineral oil fraction and in admixture therewith a minor proportion of from one-half per cent to ten per cent of an oil-miscible wax-aroxy aliphatic carboxylic acid.

10. An improved mineral oil composition comprising a viscous mineral oil fraction and in admixture therewith a minor proportion of from one-half per cent to ten per cent of an oil-miscible wax-aroxy aromatic carboxylic acid.

11. An improved mineral oil composition comprising a viscous mineral oil fraction and in admixture therewith a minor proporton of an oil-miscible wax-substituted phenyl ether acid.

12. An improved mineral oil composition comprising a viscous mineral oil fraction and in admixture therewith a minor proportion of an oil-miscible wax-phenoxy aliphatic carboxylic acid.

13. An improved mineral oil composition comprising a viscous mineral oil fraction and in admixture therewith a minor proportion of an oil-miscible wax-phenoxy aromatic carboxylic acid.

14. An improved mineral oil composition comprising a viscous mineral oil fraction and in admixture therewith a minor proportion of an oil-miscible wax-phenoxy acetic acid.

15. An improved mineral oil composition comprising a viscous mineral oil fraction and in admixture therewith a minor proportion of an oil-miscible wax-phenoxy benzoic acid.

16. An improved mineral oil composition comprising a viscous mineral oil fraction and in admixture therewith a minor proportion of an alkylated aryl ether acid obtained by reacting a chlorinated wax with a hydroxyaromatic compound in proportions such that the resulting wax-substituted hydroxy-aromatic product has a hydroxyaromatic content not greater than the chemical equivalent of about twenty per cent phenol; substituting the hydroxyl hydrogen of the wax-hydroxyaromatic compound with a metal selected from the group consisting of alkali and alkaline earth metals to form a wax-aryl metal oxide; reacting the wax-aryl metal oxide with the alkali metal salt of a halogenated organic acid to form the corresponding salt of a wax-aryl ether acid; and neutralizing said last-mentioned salt with a mineral acid to form the wax-aryl ether acid.

17. An improved mineral oil composition comprising a mineral oil fraction and in admixture therewith a minor proportion of an alkylated aryl ether acid having the general formula:

$$R^v(T(O \cdot Z \cdot COOH)Y_b)_n$$

in which: T represents an aromatic nucleus; $(O \cdot Z \cdot COOH)$ represents at least one ether acid group attached to T and wherein O represents oxygen, Z represents an aliphatic, alicyclic, or aromatic group, and COOH represents at least one carboxyl group attached to Z; $R^v$ represents at least one aliphatic hydrocarbon group of at least twenty carbon atoms and having a valence $v$ of from one to four, and attached by one valence bond only to at least one nucleus T, Y represents a monovalent radical attached to T, such radical being selected from the group consisting of residual hydrogen, alphatic radicals of less than twenty carbon atoms, and chlorine, alkoxy, aroxy, aralkyl, alkaryl, aryl, nitro, and amino radicals; b represents the number of $Y_b$'s and is equal to zero or a whole number corresponding to the valences on the nucleus T not satisfied by $R^v$ and $(O \cdot Z \cdot COOH)$; and $n$ is a whole number from one to four.

18. An improved mineral oil composition comprising a mineral oil fraction and in admixture therewith a minor proportion of an alkylated aryl ether acid having the general formula:

$$R^v(T(O \cdot Z \cdot COOH)Y_b)_n$$

in which: T represents an aromatic nucleus; $(O \cdot Z \cdot COOH)$ represents at least one ether acid group attached to T and wherein O represents oxygen, Z represents an aliphatic, alicyclic, or aromatic group, and COOH represents at least one carboxyl group attached to Z; $R^v$ represents at least one aliphatic hydrocarbon group of at least twenty carbon atoms and having a valence $v$ of from one to four, and attached by one valence only to at least one nucleus T; Y represents a monovalent radical attached to T, such radical being selected from the group consisting of residual hydrogen, aliphatic radicals of less than twenty carbon atoms, and chlorine, alkoxy, aroxy, aralkyl, alkaryl, aryl, nitro, and amino radicals; $b$ represents the number of $Y_b$'s and is equal to zero or a whole number corresponding to the valences on the nucleus T not satisfied by $R^v$ and $(O \cdot Z \cdot COOH)$; and $n$ is a whole number from one to four, the substituent $R^v$ comprising a sufficient proportion of the said alkylated aryl ether acid to render the same miscible with a viscous mineral oil under normal conditions of handling and use.

19. An improved mineral oil composition comprising a mineral oil fraction and in admixture therewith a minor proportion of an alkylated aryl ether acid having the general formula:

$$R^v(T(O \cdot Z \cdot COOH)Y_b)_n$$

in which: T represents an aromatic nucleus; $(O \cdot Z \cdot COOH)$ represents at least one ether acid group attached to T and wherein O represents oxygen, Z represents an aliphatic, alicyclic, or aromatic group, and COOH represents at least one carboxyl group attached to Z; $R^v$ represents at least one aliphatic hydrocarbon group of at least twenty carbon atoms and having a valence $v$ of from one to four, and attached by one valence only to at least one nucleus T; Y represents a monovalent radical attached to T, such radical being selected from the group consisting of residual hydrogen, aliphatic radicals of less than twenty carbon atoms, and chlorine, alkoxy, aroxy, aralkyl, alkaryl, aryl, nitro, and amino radicals; $b$ represents the number of $Y_b$'s and is equal to zero or a whole number corresponding to the replaceable hydrogens on the nucleus T not substituted by $R^v$ and $(O \cdot Z \cdot COOH)$; and $n$ is a whole number from one to four, the ratio of $(T(O \cdot Z \cdot COOH))_n$ to $R^v(T(O \cdot Z \cdot COOH))_n$ in said composition expressed as $(T(OH))_n$ to $R^v(T(OH))_n$ being not substantially greater than the chemical equivalent of about twenty per cent phenol.

20. An improved mineral oil composition comprising a mineral oil fraction and in admixture therewith a minor proportion of an alkylated aryl ether acid having the general formula:

$$R^{v'}(T(O \cdot Z \cdot COOH)Y_b R_c)_{n'}$$

in which: T represents an aromatic nucleus; $(O \cdot Z \cdot COOH)$ represents at least one ether acid group attached to T and wherein O represents oxygen, Z represents an aliphatic, alicyclic, or aromatic group; COOH represents at least one carboxyl group attached to Z; $R^{v'}$ represents at least one polyvalent aliphatic hydrocarbon group of at least twenty carbon atoms and having a valence $v'$ of from two to four, and attached by one valence only to at least one nucleus T; $Y_b'$ represents a monovalent radical attached to T, such radical being selected from the group consisting of residual hydrogen, aliphatic radicals of less than twenty carbon atoms, and chlorine, alkoxy, aroxy, aralkyl, alkaryl, aryl, nitro, and amino radicals; $b'$ represents the number of $Y_b'$'s and is equal to zero or a whole number corresponding to the replaceable hydrogens on the nucleus T not substituted by $R^{v'}$, $(O \cdot Z \cdot COOH)$ and $R_c$; $R_c$ represents a monovalent aliphatic hydrocarbon group of at least twenty carbon atoms; $c$ represents the number of $R_c$'s and is equal to zero or a whole number corresponding to the replaceable hydrogens on the nucleus T not substituted by $R^{v'}$, $(O \cdot Z \cdot COOH)$ and $Y_b'$; and $n'$ is a whole number from two to four.

ORLAND M. REIFF.
FERDINAND P. OTTO.